Patented Aug. 1, 1944

2,354,838

UNITED STATES PATENT OFFICE 2,354,838

WAXY STARCH PRODUCT AND METHOD OF MAKING

Herman H. Schopmeyer and George E. Felton, Hammond, Ind., assignors to American Maize-Products Company, a corporation of Maine No Drawing. Application August 8, 1940. Serial No. 351,914

7 Claims. (Cl. 127—33)

This invention relates to a waxy starch product and the method of making. More particularly the invention relates to a thin bodied waxy starch of high adhesive strength and of exceptional clarity and freedom from set back of its aqueous gel.

In the making of thin bodied starch, it has been considered impractical or impossible heretofore to make such a starch that gives practically a clear gel in water, is of very high adhesive strength and is free from set back of its aqueous gel. Previously made gels of thin bodied starch have been turbid or when allowed to stand, have undergone set back, that is, stiffened on standing to form a gel. We have now found it possible to make a thin bodied starch that is free from these objections to such starches as have been made heretofore and that has high adhesive strength.

This result we obtain by treating waxy starch with an active oxidizing agent, suitably at a pH substantially above 7, until the fluidity is reduced to the figure corresponding to the viscosity desired in the finished starch product. More specifically, the invention comprises the treatment of waxy starch in the presence of a water soluble sodium hypochlorite or the like under relatively mild conditions. The invention comprises also the product of the treatment, a typical product so made showing a pick test of about 7 when tested according to the standard method, giving a very clear aqueous gel, and being free from set back of the gel when the gel contains even as much as 1 part of the treated starch to 2.5 parts of water.

The conditions under which the treatment is made may be varied somewhat, in accordance with the properties that are desired in the finished product. Thus the temperature of the treatment with hypochlorite or the like may be varied from room temperature to a temperature slightly below that, which if reached, would cause pasting of the starch. The temperature should not appreciably exceed 120° F. A temperature of about 80 to 110° F. has been found to be satisfactory in giving a relatively quick reaction without causing pasting. Likewise, the period of treatment may be varied but should be sufficiently long to insure substantial completion of reaction between the hypochlorite or the like and the waxy starch. Periods of one-half to two hours are ordinarily adequate, the time required being less at the higher temperatures of reaction and more at lower temperatures.

Since the use with waxy starch of water soluble hypochlorites, such as the sodium or potassium salts, gives particularly satisfactory products, the invention will be illustrated in detail by description in connection with the use of hypochlorites.

In a typical preparation, there was made an aqueous suspension or slurry containing 200 parts dry weight of waxy maize starch and water in amount to make the density of the suspension approximately 21 Bé. This mixture was then treated with a solution of sodium hypochlorite at a pH of approximately 10, the hypochlorite being used in amount corresponding to 5 parts of available chlorine. The treatment was made at approximately 100° F., the mixture of all of the ingredients being stirred at that temperature for about one hour. Then the alkalinity was neutralized by the addition of sulfuric acid.

Finally, the starch product appearing as a solid in the resulting mixture was separated from the liquid by filtration. The filtered starch product was washed and dried in usual manner.

The starch product made as described was tested in a mixture with water in the proportion of 2.5 parts of water to 1 of the waxy starch product. The mixture when cooked gave a thin mass that was very clear as compared to previously made thin boiling starch and that showed no set back on cooling. Tested for adhesive strength on paper in the usual manner, the modified waxy maize starch showed a pick test of 7.5. The product when formed into films shows high strength and excellent transparency.

The tendency to set back of the aqueous gel on cooling is much less in the product made as described than in the case of oxidized common starch.

The oxidized waxy starch gives a reddish brown color in the iodine test, as compared to blue for chlorinated common starch.

Because of its properties, our waxy starch product is useful as an adhesive, as a tub size in the paper industry, and in paper coatings.

The alkalinity of the mixture at the start of the reaction of the hypochlorite and waxy starch may be established by the use of sodium hydroxide, sodium carbonate, or like alkali.

It is important that the pH value so established be greater than 7 and preferably 8 to 11, so that the treated starch will have the desired properties and contain a minimum of undesired decomposition products.

Various degrees of modification of the starch may be obtained by the use of various proportions of the hypochlorite or of other active oxidizing agents substituted for the hypochlorite. Thus there may be used hydrogen peroxide or other water soluble peroxide such, for example, as barium or calcium peroxide or a water soluble permanganate such as potassium or sodium permanganate. When such other oxidizing agents are substituted for the hypochlorite, the substitution is made on the basis of the weights of the several substances required to supply equivalent amounts of the actual oxidizing agent, as, for example, oxygen or chlorine. However, a longer time of reaction is desirable when the peroxides, permanganates or the like are used. Thus the time of reaction with the latter materials is increased to advantage to several hours or more.

When hypochlorite is the oxidizing agent used, the amount of it used may be such, for example, as to give 1 to 8 parts of available chlorine for 100 parts of the waxy maize starch. The extent of the modification of the properties of the starch is greater when there is used a larger proportion of available chlorine, within the range stated. The oxidized waxy starch which is produced obviously contains oxygen in proportion greater than that in the original untreated starch.

In general the treatment with the hypochlorite or the materials of the type of peroxides or permanganates is continued until the viscosity as measured by the alkali fluidity number falls to that desired. Thus the treatment is suitably continued until the alkali fluidity number becomes at least 20, say 20 to 100. For most purposes a satisfactory alkali fluidity is 50 to 90.

Careful analysis of five samples made as described and of alkali fluidity covering well the stated range of alkali fluidity of 20 to 90 shows that in every case the copper reduction number, as determined by the method of Farley and Hixon (Ind. Eng. Chem., Anal. Ed. 13, 616, 1941), is not substantially below 23 for each specimen made as described with the use of hypochlorite as oxidizing agent.

As the starch to be used as raw material in the invention, there is used waxy starch from waxy maize, sorghum, or other known source of waxy starch. The starch gives a reddish brown color with iodine.

The test for alkali fluidity referred to herein is made as follows: 5 grams of starch of 10% moisture content is placed in a beaker and wetted with 10 cc. of distilled water. To this 90 cc. of 0.1% sodium hydroxide solution is added and the whole stirred for one minute, the temperature being brought to about 75° F. at the same time. The mixture is held at 75° for 30 minutes and the amount that will flow through a standard sized orifice or a funnel in a minute is determined. The number of cc. of outflow is used directly as the number indicating the viscosity of the starch. Thus a 60 cc. outflow indicates 60 fluidity starch. The funnel is standardized so that it will run 100 cc. of distilled water 75° in one minute.

The pick test herein referred to is made as follows: 24 grams of starch are cooked up with 175 grams of water. The product is mixed with 188 grams of clay slip, thoroughly homogenized, and coated on paper stock. The coated paper is allowed to dry overnight. Then standardized waxes having varying adhesive strengths are stuck onto the paper, allowed to cool and set firmly. They are then very carefully cracked off. These waxes are calibrated and numbered from 1 to 12, the higher number indicating the greater adhesive strength. When the wax is cracked off, it is carefully examined to see whether the coating adhered to the paper or to the wax. For example, if wax 6 is found to break free from the paper, without damaging the surface of the paper, that would indicate that the strength of the coating was greater than the strength of the wax and that the wax or pick test is above 6. If the wax were found in breaking off to tear the coating, that would indicate that the wax had greater strength than the coating and the pick test was below 6. The pick test is the number of the wax of lowest strength that does tear the coating on the paper.

It will be understood that the details given are for the purpose of illustration and that variations within the spirit of the invention are intended to be included within the scope of the appended claims.

What we claim is:

1. In making a thin bodied starch of high adhesive strength, exceptional clarity and freedom from set back of its aqueous gel, the method which comprises forming a mixture of waxy starch and water, treating the mixture with an active oxidizing agent at a pH of about 7 to 11 and at a temperature below the pasting point of the starch until the reaction between the oxidizing agent and the waxy starch is substantially complete, and separating the resulting starch product from the suspension.

2. In making a starch product, the method which comprises forming an aqueous suspension including waxy starch, treating the suspension with a water soluble hypochlorite at a pH greater than 7, but not substantially above 11 and at a temperature below the pasting point of the starch until the hypochlorite added is substantially completely reacted, separating the resulting solid product from the remaining liquid, and washing and drying the separated product.

3. The method described in claim 2, the treatment with the hypochlorite being continued for about one-half to two hours and at a temperature not below room temperature but below the pasting temperature of the waxy starch.

4. The method described in claim 2, the treatment with the hypochlorite being continued until the alkali fluidity is at least 20.

5. In making a starch product, the method which comprises forming an aqueous suspension including waxy starch, treating the suspension with a water soluble permanganate at a pH above 7 but not substantially above 11 and at a temperature below the pasting point of the starch until the reaction between the permanganate and the waxy starch is substantially complete, separating the resulting solid product from the remaining liquid, and washing and drying the separated product.

6. A thin bodied starch product comprising hypochlorite treated waxy starch containing oxygen in proportion greater than that in the original starch, having a copper reduction number by the Farley and Hixon method not substantially below 23, having an alkali fluidity of 20 to 90, giving with iodine a reddish brown color, and giving with water a clear gel of high adhesive strength that is substantially free from set back.

7. The method described in claim 1, the proportion of hypochlorite used being that required to supply 1 to 8 parts of available chlorine for 100 parts of the waxy starch.

HERMAN H. SCHOPMEYER.
GEORGE E. FELTON.